United States Patent
Dunko et al.

(10) Patent No.: US 7,529,556 B2
(45) Date of Patent: May 5, 2009

(54) SITE DEPENDENT BUDDY LIST ADDITION FOR TEMPORARY PTT COMMUNICATION

(75) Inventors: Gregory A. Dunko, Cary, NC (US); Jonathan C. Lohr, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 486 days.

(21) Appl. No.: 10/711,803

(22) Filed: Oct. 6, 2004

(65) Prior Publication Data

US 2006/0084456 A1    Apr. 20, 2006

(51) Int. Cl.
*H04B 7/00* (2006.01)
(52) U.S. Cl. ................................. 455/518; 455/519
(58) Field of Classification Search ............. 455/518, 455/519
See application file for complete search history.

(56) References Cited

U.S. PATENT DOCUMENTS

| | | | | |
|---|---|---|---|---|
| 5,530,914 | A * | 6/1996 | McPheters | 455/518 |
| 7,170,863 | B1 * | 1/2007 | Denman et al. | 370/260 |
| 2003/0078064 | A1 * | 4/2003 | Chan | 455/514 |
| 2003/0080897 | A1 * | 5/2003 | Tranchina et al. | 342/357.1 |
| 2004/0082351 | A1 | 4/2004 | Westman | |
| 2004/0219940 | A1 * | 11/2004 | Kong et al. | 455/518 |
| 2006/0040691 | A1 * | 2/2006 | Diep et al. | 455/518 |
| 2006/0089167 | A1 * | 4/2006 | Idnani | 455/518 |
| 2006/0172755 | A1 * | 8/2006 | Park | 455/518 |

FOREIGN PATENT DOCUMENTS

WO    WO 2004/012421 A1    2/2004

OTHER PUBLICATIONS

Sony Ericsson Mobile Communications AB, *International Application Ser. No. PCT/US2005/013154*, "International Search Report", Aug. 1, 2005.
Sony Ericsson Mobile Communications AB, *International Application Ser. No. PCT/US2005/013154*, "Written Opinion", Aug. 1, 2005.

* cited by examiner

*Primary Examiner*—Matthew D Anderson
*Assistant Examiner*—Bobbak Safaipour
(74) *Attorney, Agent, or Firm*—Frederick D. Bailey; Moore & Van Allen, PLLC

(57) ABSTRACT

A system and method of creating a temporary site dependent push-to-talk/media (PTT/M) group for allowing PTT/M communications among a visiting PTT/M equipped mobile device and site based PTT/M equipped devices while the visiting PTT/M equipped mobile device is on-site. An on-site device is responsible for detecting when a visiting PTT/M equipped mobile device comes on-site and initiating a registration process. The registration process registers the visiting PTT/M equipped mobile device with the site based PTT/M equipped devices and the site based PTT/M equipped devices with the visiting PTT/M equipped mobile device such that normal group PTT/M communications can take place. When the visiting PTT/M equipped device leaves the site its absence is detected and a de-registration process is initiated. De-registration removes the recently added device IDs from the site's PTT/M network server and the visiting mobile's PTT/M network server.

12 Claims, 4 Drawing Sheets

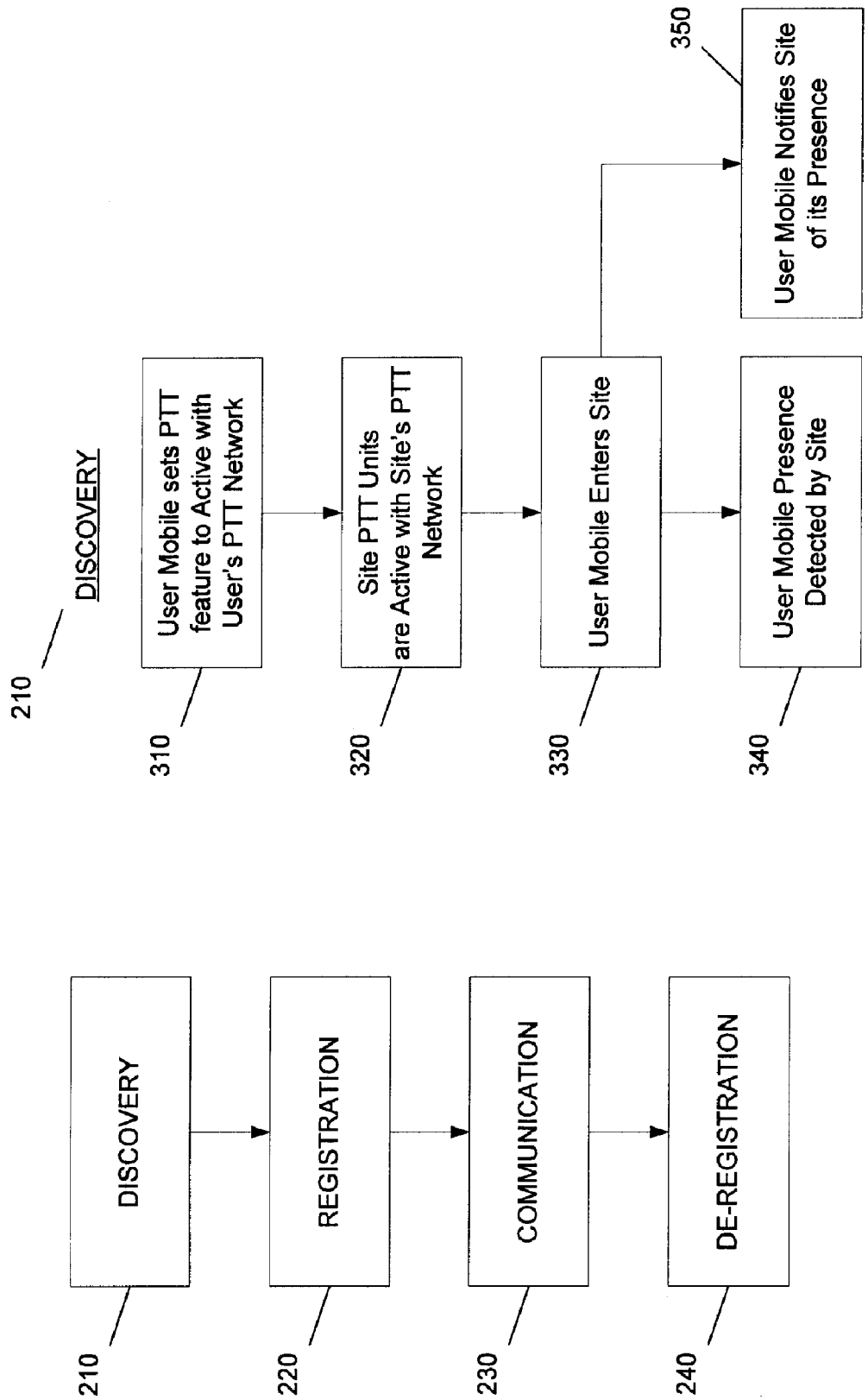

SITE DEPENDENT BUDDY LIST ADDITION FOR TEMPORARY PTT COMMUNICATION

BACKGROUND

Push-to-talk (PTT) or "Walkie Talkie" mode is the latest "Killer" application for mobile communication devices. The basic operation is as follows. Two subscribed users (buddies) have PTT enabled devices that are connected to a PTT service (typically a PTT server integrated into the wireless network infrastructure). The service keeps track of when each user is connected and available and conveys this information to the other user. When desired, a user initiates a "walkie-talkie" session by pressing the PTT button. This process is quicker and more direct than a traditional Mobile Originated (MO) call. The users then proceed with their direct conversation. In the coming years this is expected to grow to a "push-to-media" service in which users can talk and communicate using pictures and video.

Push-to-talk/media (PTT/M) has primarily been used by "closed" groups such as building contractors, etc. but is increasingly becoming more popular in broader mainstream circles. Presently, users create buddy lists (or groups) based on codes and store the codes permanently in the mobile device. The buddy lists support PTT/M communications within "known circles".

SUMMARY

The present invention includes a system and method of creating a temporary site dependent push-to-talk/media group for allowing PTT/M communications among a visiting PTT/M equipped mobile device and site based PTT/M equipped devices while the visiting PTT/M equipped mobile device is on-site. The PTT/M equipped devices operate on one or more inter-communicable PTT/M networks. An on-site device is responsible for detecting when a visiting PTT/M equipped mobile device comes on-site and initiating a registration process. The registration process registers the visiting PTT/M equipped mobile device with the site based PTT/M equipped devices and the site based PTT/M equipped devices with the visiting PTT/M equipped mobile device such that normal group PTT/M communications can take place. Registration involves adding, on the site based PTT/M equipped devices PTT/M network server, the visiting PTT/M equipped mobile device ID and on the visiting PTT/M equipped mobile device PTT/M network server, adding the site based PTT/M equipped device IDs.

When the visiting PTT/M equipped device leaves the site its absence is detected and a de-registration process is initiated. De-registration removes the recently added device IDs from the site's PTT/M network server and the visiting mobile's PTT/M network server leaving the group or "buddy" lists for both the visiting PTT/M equipped mobile device and the site based PTT/M equipped devices as they were before the visiting mobile was added to the group.

As a back-up, the visiting PTT/M equipped mobile device will be automatically de-registered after a specified period of time if it cannot be detected when the visiting PTT/M equipped mobile device has gone off-site.

BRIEF DESCRIPTION OF THE DRAWINGS

FIG. 2 is a flowchart of the major processes of the present invention.

FIG. 3 is a flowchart further describing the discovery process.

DETAILED DESCRIPTION

Figure 1:
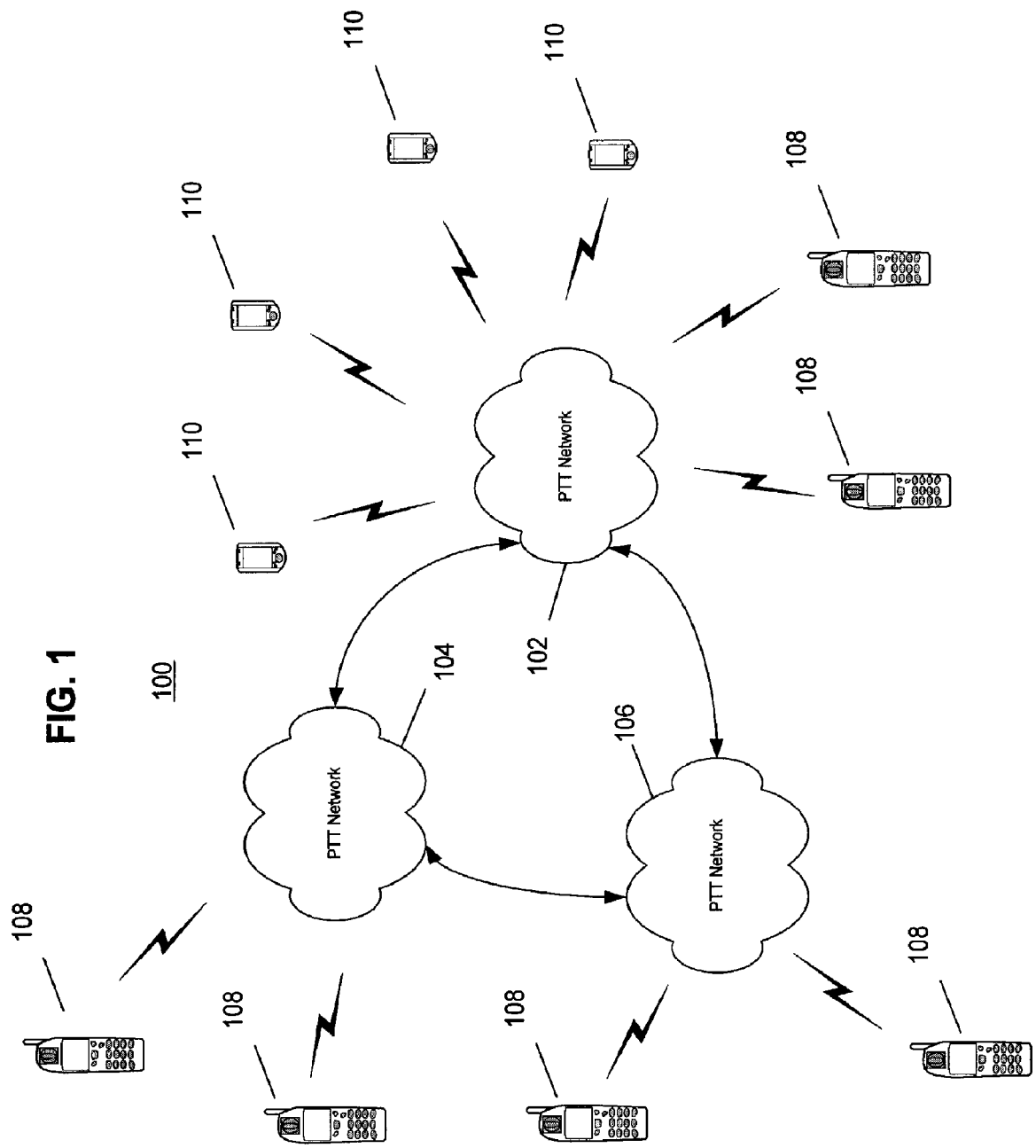
FIG. 1 is a network diagram of a temporary site dependent PTT/M network.

FIG. 1 is a network diagram 100 of a temporary site dependent PTT/M network. The network diagram illustrates different PTT/M connections that can be linked to create a temporary site dependent buddy list. For instance, consider the scenario in which a restaurant/bar is the "site" for a temporary or dynamic PTT/M network. In this example, PTT/M network 102 services the restaurant. In other words, the restaurant has a plurality of mobile devices or PTT/M units 110 that subscribe to PTT/M network 102. Since PTT/M network 102 can be a public network, it is also possible that individual user mobile devices 108 subscribe to the same network. Other PTT/M networks (e.g., 104 and 106) are communicable with one another and PTT/M network 102 such that individual user mobile devices 108 can communicate with one another using PTT/M (or PTM—push-to-media such as instant text messaging). The PTT/M units 110 utilized by the restaurant in this example may correspond to certain functions such as bartender, waiter, hostess, etc. Thus, FIG. 1 illustrates an infrastructure in which the present invention operates.

FIG. 2 is a flowchart of the major processes of the present invention. There are four (4) major processes: discovery 210; registration 220; communication 230; and de-registration 240. Discovery 210 refers to the process of having a customer mobile 108 be discovered or recognized by the site's PTT/M network server. Since the present invention is site dependent, discovery 210 should occur when a user's mobile device enters a certain proximity relative to the site. In addition, discovery 210 should be as transparent a process to the user's mobile device as possible. Short range wireless technologies such as Bluetooth™ or 802.11 are ideal for this function.

The next process, registration 220, refers to adding the customer mobile device to the site dependent buddy list. Once the customer has been added to the site dependent buddy list he is free to engage in communication 230 with other members of the site dependent buddy list. When the mobile device leaves the proximity of the site, the mobile device undergoes a de-registration process 240 that effectively removes it from the site dependent buddy list freeing the resources within the mobile device that were being used while a part of the site dependent buddy list.

Initially, a user possesses a PTT/M equipped mobile device that is activated. The user's PTT/M application is running and the user is "registered" with their PTT/M application server. Basic PTT/M functionality can be implemented using Voice over IP (VoIP) over GPRS or EDGE based on the PoC 1.0 Specifications. Other options are also available and include, but are not limited to, Dual Transfer Mode (DTM) and Universal Mobile Telecommunications System (UMTS) implementations. For "push-to-media", IP Multimedia Subsystem (IMS) specifications, among others, provide needed support. The user mobile device has a storable "Buddy List" that the user may use to initiate PTT/M contact. This buddy list has "space" for additional contacts and allows addition or deletion of contacts.

Similarly, a site such as a restaurant is equipped with PTT/M communications equipment. The restaurant also is running the PTT/M application and is "registered" with its PTT/M application server. The restaurant has a storable buddy list that has space for addition/deletion of contacts.

FIG. 3 describes the discovery process 210 in greater detail. As a pre-condition to discovery both the user's mobile and the site's PTT/M units need to be active 310, 320 with their respective PTT/M networks meaning that the PTT/M function is enabled on the mobile devices. Discovery is also range specific. A user mobile device should only be discoverable when it is "on-site" 330. Once on-site, the user's mobile device can be detected 340 via a short range RF or infrared technology such as Bluetooth™ (mobile and restaurant have Bluetooth™ enabled and "sense" each other), WiFi (802.11), IrDa (a user may beam presence to an IrDA device in restaurant entrance), or via location (device may be equipped with GPS or other positioning capability and could notify PTT/M server based on sensed location). Alternatively, the user can notify the site of his presence 350 using the same or similar technologies.

Figure 4:
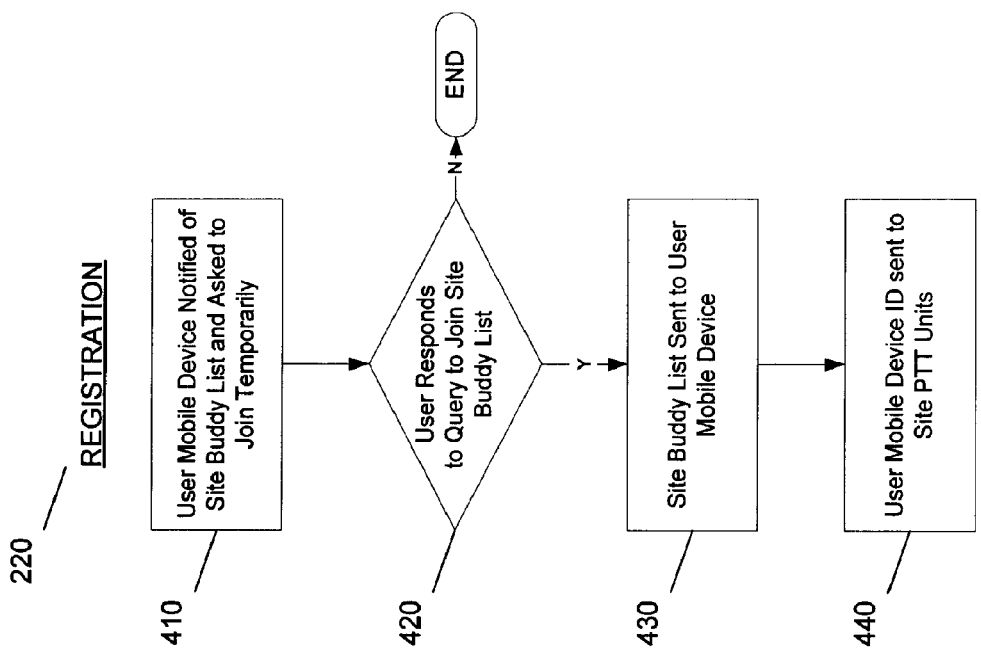
FIG. 4 is a flowchart further describing the registration process.

FIG. 4 describes the registration process in greater detail. Once the user's mobile is discovered, a message is sent to that mobile inviting it to join the site's buddy list for the duration of the visit 410. The message can be sent from a controlling or coordinating site PTT/M unit that is responsible for the discovery, registration, and de-registration processes. The mobile device responds to the query 420. If the response is negative the process is terminated. If the response is positive, however, the mobile device is sent a copy of the site's PTT/M buddy list 430. In addition, the mobile device sends its PTT/M ID to the site's controlling PTT/M unit 440. This could occur via Bluetooth, IrDA, SMS, SMS-CB, WAP Push, or other mechanisms. If the user accepts the new PTT/M buddy list contact or group, then this "addition" is communicated to the PTT/M server of both the user mobile device and the restaurant. Note that both may subscribe to the same PTT/M service or may be supported through interoperable PTT/M services.

The mobile device then updates its PTT/M buddy list with the new additions while the site updates all (or a subset) of its PTT/M units with the user's mobile device ID. In the restaurant/bar example, site PTT/M units may include a host/hostess, a waiter/waitress, a bartender, etc. Once the affected PTT/M units have had their buddy lists updated, normal PTT/M communications between or among any of the PTT/M units can occur. Since the buddy lists are presently maintained on a PTT/M server, all updates to mobile device and PTT/M unit buddy lists are performed by and updated in the PTT/M server.

Figure 5:
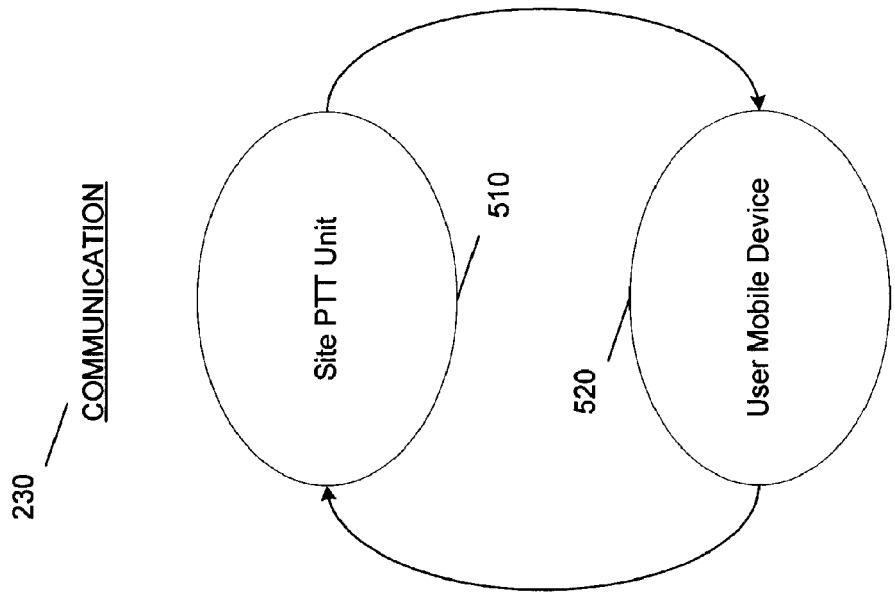
FIG. 5 is a flowchart further describing the communication process.

FIG. 5 describes the communication process in greater detail. The communications process is essentially the same as existing PTT/M methods. A site PTT/M unit 510 can contact an individual mobile device 520 and vice-versa. Such communications can be used, for instance, to summon a waiter, place a food order, place a drink order, request the check, etc. In addition, push-to-media (PTM) can be utilized if supported by the PTT/M units. PTM would allow individual mobile devices to text (or even picture) message an order or request to a specific restaurant (site) employee as opposed to voice communications. This may be desirable to maintain a quieter atmosphere while in the restaurant.

Figure 6:
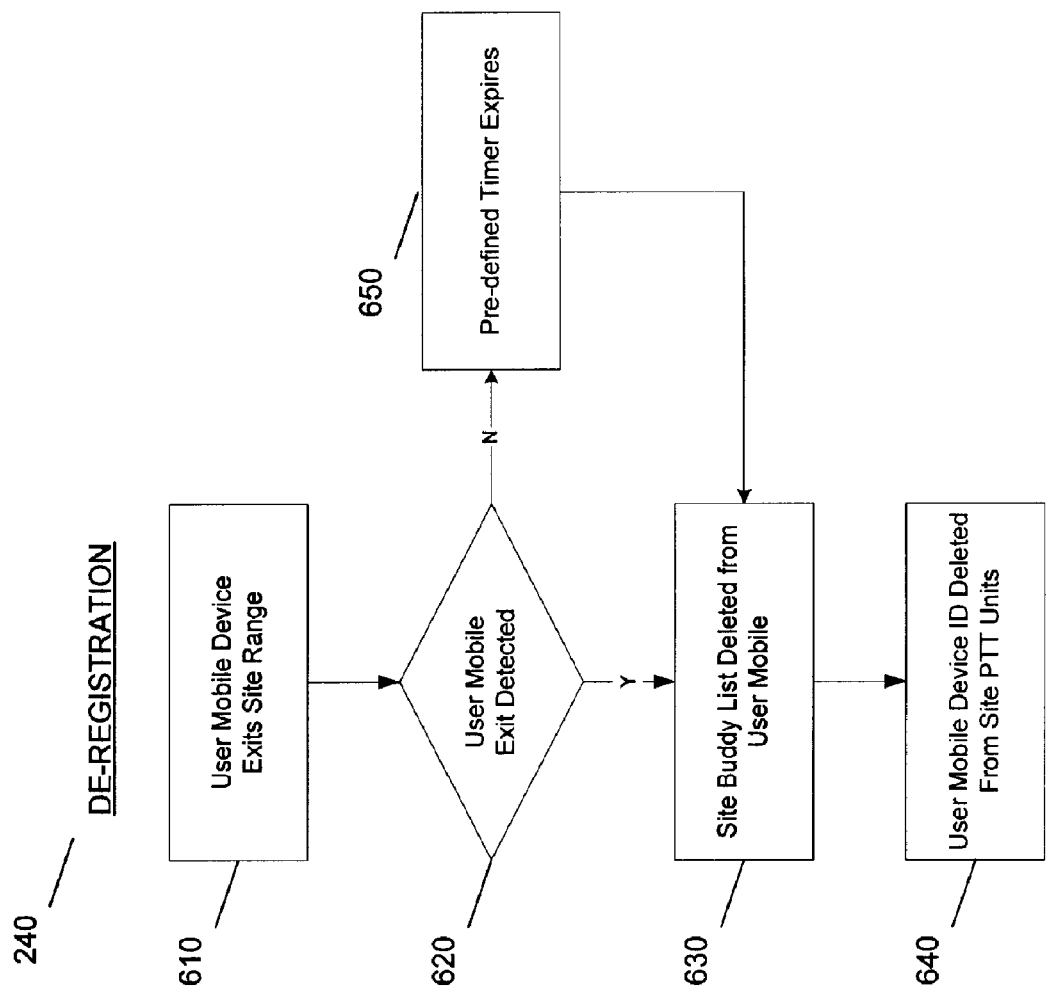
FIG. 6 is a flowchart further describing the de-registration process.

FIG. 6 describes the de-registration process in greater detail. When the user's mobile device exits the range of the site 610, its exit is presumably detected 620 much the same as its original presence was detected. Upon this detection, the mobile device deletes the site's buddy list 630 meaning that the information is removed from the mobile device's PTT/M server profile. Similarly, the site's PTT/M server removes the mobile device's ID from its server profile 640. The de-registration process gives the present invention its temporary nature. This avoids the problem of the PTT/M server's running out of resources for ever expanding buddy lists. It also makes the buddy lists for both the user's mobile device and the site's PTT/M units relevant to the present. Users that visited the site two days ago will not still be "in the system" or registered with the PTT/M servers. Upon successful completion, the mobile device and restaurant buddy lists are exactly the same as before the temporary PTT/M communications session commenced.

If for some reason the mobile device's exit from the site was not detected, a pre-defined timeout period will serve as a back up. When a user is registered, a timeout period corresponding to an expected duration will automatically be associated with the mobile device. If this timeout period is reached, the buddy lists will be deleted 630, 640 from the PTT/M servers of the site and the mobile. The site can set the expected timeout periods. In the restaurant example, a three hour duration may be considered typical. A bar/nightclub can also initiate de-registration at last call or closing time.

Sometimes a user may frequent a site regularly. In such cases it can be advantageous to store one another's PTT/M data so that the registration process can be streamlined. When a user returns to a site, he can either be detected or make himself known.

Rather than go through an entire discovery and new registration process—the user and the site have a "stored" record that is made active when the "regular" user is detected or makes himself known. The user's device can use location based services to determine that he is at the site and then may contact the site automatically via Bluetooth™, WLAN, SMS, etc. Or, the user could manually make himself known. Alternatively, possibly the user could attempt to contact the site via PTT/M. While this contact may initially be "unknown" or unrecognized at the receiving (site) end, there could be a step in the negotiation/setup process where the initializing caller is "recognized".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A method of creating a temporary site dependent push-to-talk/media (PTT/M) group for allowing PTT/M communications among a visiting PTT/M equipped mobile device and site based PIT/M equipped devices while the visiting PTT/M equipped mobile device is on-site wherein the PTT/M equipped devices operate on one or more inter-communicable PTT/M networks, the method comprising:
   detecting when a visiting PTT/M equipped mobile device is physically located on-site;
   registering the visiting PTT/M equipped mobile device with the site based PTT/M equipped devices and the site based PTT/M equipped devices with the visiting PTT/M equipped mobile device such that normal group PTT/M communications can take place, the registering comprising:
      automatically associating a pre-defined timeout period with the visiting PTT/M equipped mobile device:
      on a site based PTT/M equipped devices PTT/M network server, adding the visiting PIT/M equipped mobile device ID; and
      on a visiting PTT/M equipped mobile device PTT/M network server, adding site based PTT/M equipped device IDs;
   detecting when a visiting PTT/M equipped mobile device goes off-site;
   de-registering the visiting PTT/M equipped mobile device with the site based PTT/M equipped devices and the site based PTT/M equipped devices with the visiting PTT/M equipped mobile device when the PTT/M equipped mobile device goes off-site, the de-registering comprising:
      on the site based PTT/M equipped devices PTT/M network server, removing the visiting PTT/M equipped mobile device ID; and
      on the visiting PTT/M equipped mobile device PTT/M network server, removing the site based PIT/M equipped device IDs;
   wherein two-way PTT/M communications are allowed among the visiting PTT/M equipped mobile device and the site based PTT/M equipped device while the visiting PTT/M equipped mobile device is physically on-site, and
   wherein the visiting PTT/M equipped mobile device will be de-registered after the pre-defined timeout period when it cannot be detected when the visiting PTT/M equipped mobile device has gone off-site.

2. The method of claim 1 wherein detecting when a visiting PTT/M equipped mobile device is physically located on-site comprises sensing the visiting PTT/M equipped mobile device using Bluetooth™ technology.

3. The method of claim 1 wherein detecting when a visiting PTT/M equipped mobile device is physically located on-site comprises sensing the visiting PTT/M equipped mobile device using 802.11 WiFi technology.

4. The method of claim 1 wherein detecting when a visiting PTT/M equipped mobile device is physically located on-site comprises sensing the visiting PTT/M equipped mobile device using IrDa infra-red technology.

5. The method of claim 1 wherein detecting when a visiting PTT/M equipped mobile device is physically located on-site comprises sensing the visiting PTT/M equipped mobile device using location based services.

6. The method of claim 5 wherein the location based services include the global positioning system (GPS).

7. A system for creating a temporary site dependent push-to-talk/media (PTT/M) group for allowing PTT/M communications among a visiting PTT/M equipped mobile device and site based PTT/M equipped devices while the visiting PTT/M equipped mobile device is on-site wherein the PTT/M equipped devices operate on one or more inter-communicable PTT/M networks, the method comprising:
   first discovery means for detecting when a visiting PTT/M equipped mobile device is physically located on-site;
   registration means for registering the visiting PTT/M equipped mobile device with the site based PTT/M equipped devices and the site based PTT/M equipped devices with the visiting PTT/M equipped mobile device such that normal group PTT/M communications can take place, the registering comprising:
      automatically associating a pre-defined timeout period with the visiting PTT/M equipped mobile device:
      on a site based PTT/M equipped devices PTT/M network server, adding the visiting PTT/M equipped mobile device ID; and
      on a visiting PTT/M equipped mobile device PTT/M network server, adding site based PTT/M equipped device IDs;
   second discovery means for detecting when a visiting PTT/M equipped mobile device goes off-site;
   de-registration means for de-registering the visiting PTT/M equipped mobile device with the site based PTT/M equipped devices and the site based PTT/M equipped devices with the visiting PTT/M equipped mobile device when the PTT/M equipped mobile device goes off-site, the de-registering comprising:
      on the site based PTT/M equipped devices PTT/M network server, removing the visiting PTT/M equipped mobile device ID; and
      on the visiting PTT/M equipped mobile device PTT/M network server, removing the site based PTT/M equipped device IDs;
   wherein two-way PTT/M communications are allowed among the visiting PTT/M equipped mobile device and the site based PTT/M equipped devices while the visiting PTT/M equipped mobile device is physically on-site; and
   wherein the visiting PTT/M equipped mobile device is automatically de-registered after the pre-defined timeout period if it cannot be detected when the visiting PTT/M equipped mobile device has gone off-site.

8. The system of claim 7 wherein the first discovery means for detecting when a visiting PTT/M equipped mobile device is physically locatedon-site comprises sensing the visiting PTT/M equipped mobile device using Bluetooth™ technology.

9. The system of claim 7 wherein the first discovery means for detecting when a visiting PTT/M equipped mobile device is physically locatedon-site comprises sensing the visiting PTT/M equipped mobile device using 802.11 WiFi technology.

10. The system of claim 7 wherein the first discovery means for detecting when a visiting PTT/M equipped mobile device is physically locatedon-site comprises sensing the visiting PTT/M equipped mobile device using IrDa infra-red technology.

11. The system of claim 7 wherein the first discovery means for detecting when a visiting PTT/M equipped mobile device is physically locatedon-site comprises sensing the visiting PTT/M equipped mobile device using location based services.

12. The system of claim 11 wherein the location based services include the global positioning system (GPS).

\* \* \* \* \*

UNITED STATES PATENT AND TRADEMARK OFFICE
CERTIFICATE OF CORRECTION

PATENT NO. : 7,529,556 B2 Page 1 of 1
APPLICATION NO. : 10/711803
DATED : May 5, 2009
INVENTOR(S) : Gregory A. Dunko and Jonathan C. Lohr It is certified that error appears in the above-identified patent and that said Letters Patent is hereby corrected as shown below:

Column 6, line 65, please delete "locatedon-site" and insert in place thereof
-- located on-site --

Column 7, line 3, please delete "locatedon-site" and insert in place thereof
-- located on-site --

Column 7, line 8, please delete "locatedon-site" and insert in place thereof
-- located on-site --

Column 8, line 3, please delete "locatedon-site" and insert in place thereof
-- located on-site --

Signed and Sealed this

Sixteenth Day of June, 2009

JOHN DOLL
*Acting Director of the United States Patent and Trademark Office*